(12) United States Patent
Ma et al.

(10) Patent No.: US 11,501,082 B2
(45) Date of Patent: Nov. 15, 2022

(54) SENTENCE GENERATION METHOD, SENTENCE GENERATION APPARATUS, AND SMART DEVICE

(71) Applicant: UBTECH ROBOTICS CORP LTD, Shenzhen (CN)

(72) Inventors: Li Ma, Shenzhen (CN); Weixing Xiong, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 441 days.

(21) Appl. No.: 16/734,389

(22) Filed: Jan. 5, 2020

(65) Prior Publication Data
US 2021/0056266 A1 Feb. 25, 2021

(30) Foreign Application Priority Data
Aug. 23, 2019 (CN) .......................... 201910782430.6

(51) Int. Cl.
*G06F 40/30* (2020.01)
*G06F 16/31* (2019.01)
*G06F 16/35* (2019.01)
*G06F 40/205* (2020.01)

(52) U.S. Cl.
CPC ............ *G06F 40/30* (2020.01); *G06F 16/322* (2019.01); *G06F 16/353* (2019.01); *G06F 40/205* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 5,682,539 A | * | 10/1997 | Conrad ................... | G06F 40/40 704/9 |
| 6,487,545 B1 | * | 11/2002 | Wical .................... | G06F 40/289 706/45 |
| 7,788,262 B1 | * | 8/2010 | Shirwadkar ............. | G06F 16/36 707/602 |

(Continued)

OTHER PUBLICATIONS

Miranda de Novais, Text-to-text surface realisation using dependency-tree replacement, Ibero-American Conference on Artificial Intelligence, 2010, pp. 326-335, (Year: 2010).*

*Primary Examiner* — Lamont M Spooner

(57) ABSTRACT

The present disclosure provides a sentence generation method as well as a sentence generation apparatus and a smart device. The method includes: obtaining an input sentence; searching for structurally similar sentence(s) of each input sentence, where the structurally similar sentence(s) are structurally similar to the input sentence; finding semantically similar sentence(s) of the structurally similar sentence(s); parsing the input sentence and the structurally similar sentence(s) to obtain a subject block, a predicate block, and an object block to rewrite the semantically similar sentences to generate a new sentence; filtering the new sentence based on a preset filtering condition; and labeling the filtered new sentence as a semantically similar sentence of the input sentence. In this manner, a plurality of new sentences with different sentence patterns can be generated based on the same input sentence, which improves the controllability in generating the sentences and saves the labor cost therein.

20 Claims, 3 Drawing Sheets

(56) References Cited

U.S. PATENT DOCUMENTS

| | | | | |
|---|---|---|---|---|
| 7,970,600 | B2* | 6/2011 | Chen | G06F 40/205 |
| | | | | 704/10 |
| 8,914,278 | B2* | 12/2014 | Zangvil | G10L 15/26 |
| | | | | 704/235 |
| 9,015,036 | B2* | 4/2015 | Karov Zangvil | G06F 40/274 |
| | | | | 704/9 |
| 9,390,087 | B1* | 7/2016 | Roux | G06F 40/56 |
| 10,546,063 | B2* | 1/2020 | Beller | G06F 40/289 |
| 10,706,236 | B1* | 7/2020 | Platt | G06F 40/253 |
| 10,990,767 | B1* | 4/2021 | Smathers | G06F 16/322 |
| 11,334,726 | B1* | 5/2022 | Platt | G06F 40/253 |
| 2004/0205737 | A1* | 10/2004 | Margaliot | G06F 40/211 |
| | | | | 717/143 |
| 2012/0296845 | A1* | 11/2012 | Andrews | G06Q 40/06 |
| | | | | 705/36 R |
| 2016/0170972 | A1* | 6/2016 | Andrejko | G06F 40/242 |
| | | | | 704/9 |
| 2017/0200081 | A1* | 7/2017 | Allen | G06F 40/205 |
| 2017/0228361 | A1* | 8/2017 | Zhang | G06F 16/313 |
| 2017/0337180 | A1* | 11/2017 | Wang | G06F 40/253 |
| 2019/0318648 | A1* | 10/2019 | Zhang | G09B 7/04 |
| 2020/0020325 | A1* | 1/2020 | Nam | G06F 16/322 |
| 2020/0073944 | A1* | 3/2020 | Mishra | G06F 40/247 |
| 2021/0034705 | A1* | 2/2021 | Chhaya | G06N 3/0445 |
| 2022/0262471 | A1* | 8/2022 | Nakamura | A61B 6/00 |

* cited by examiner

SENTENCE GENERATION METHOD, SENTENCE GENERATION APPARATUS, AND SMART DEVICE

CROSS REFERENCE TO RELATED APPLICATIONS

This application claims priority to Chinese Patent Application No. 201910782430.6, filed Aug. 23, 2019, which is hereby incorporated by reference herein as if set forth in its entirety.

BACKGROUND

1. Technical Field

The present disclosure relates to data processing technology, and particularly to a sentence generation method as well as a sentence generation apparatus and a smart device.

2. Description of Related Art

In the current era of artificial intelligence, the intelligence of human-computer interaction has become a focus of people's attention. In the human-machine dialogue between the smart product and the user, in order to increase the coverage of sentence similarity matching, it is often necessary to provide multiple similar questions for each question with a certain composed answer. Therefore, the plentiness of these similar questions has a crucial impact to the accuracy of the matching results. In the prior art, the developer or the maintenance personnel usually edit multiple similar questions corresponding to the answer manually to store into the smart products in advance, which will cause large labor costs.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

In the embodiments of the present disclosure, a sentence generation method as well as an apparatus, a sentence generation apparatus, and a smart device can be applied to intelligent products that can interact with a user, for example, robots, smart phones, and tablet computers. For explaining the forgoing technical solutions of the present disclosure, the following descripts through embodiments.

Embodiment One

Figure 1:
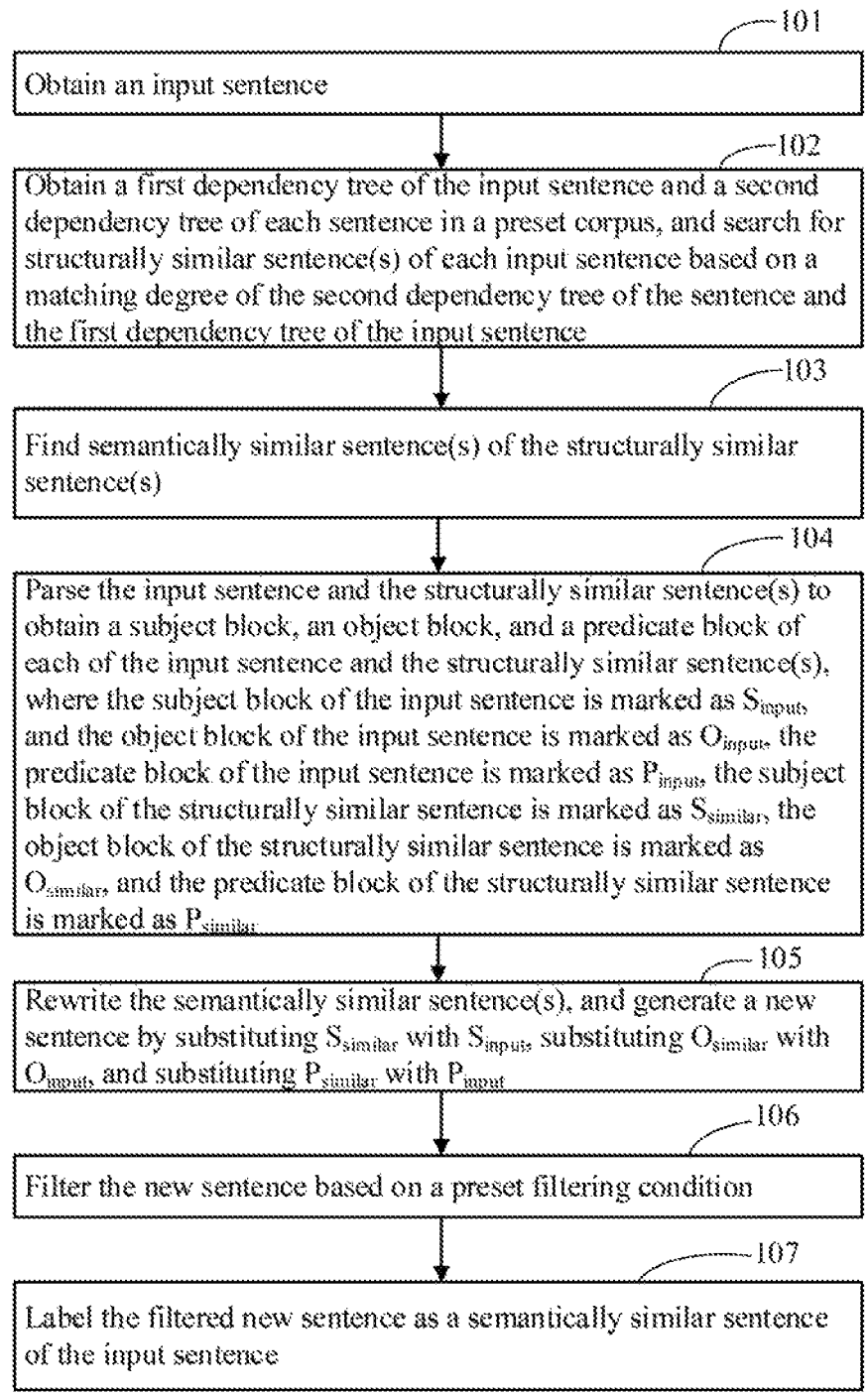
FIG. 1 is a flow chart of an embodiment of a sentence generation method according to the present disclosure.
Figure 2:
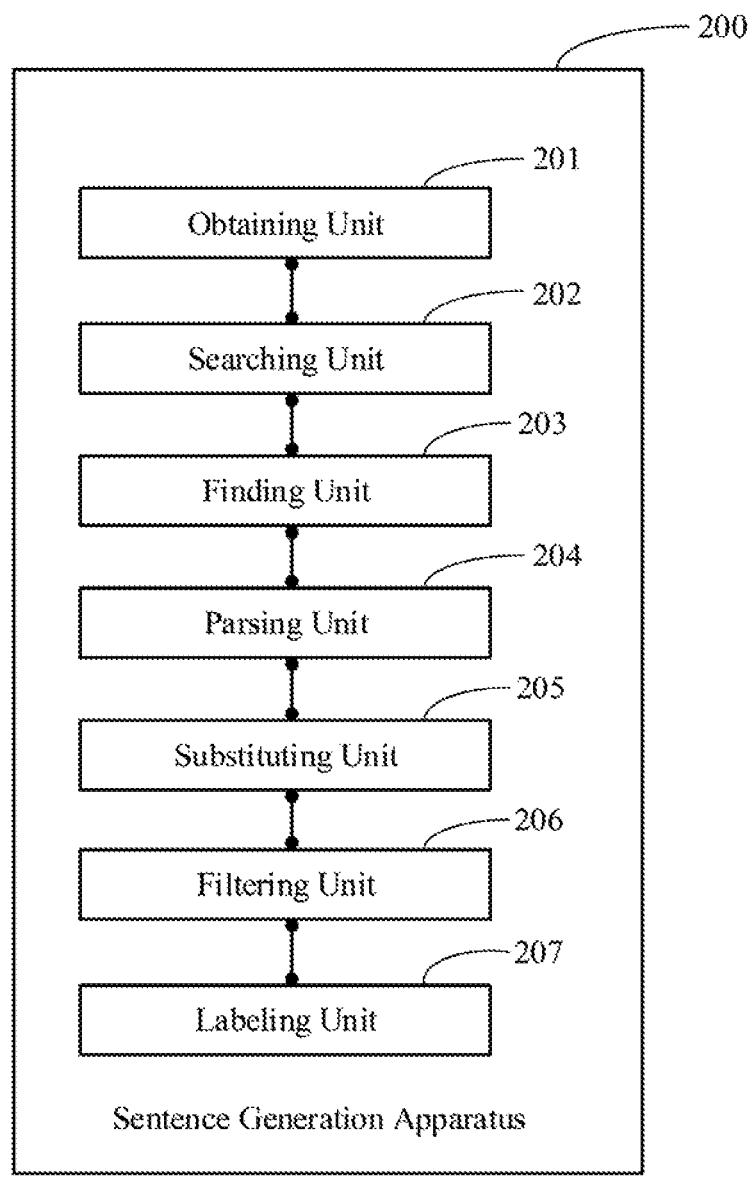
FIG. 2 is a schematic block diagram of an embodiment of a sentence generation apparatus according to the present disclosure.
Figure 3:
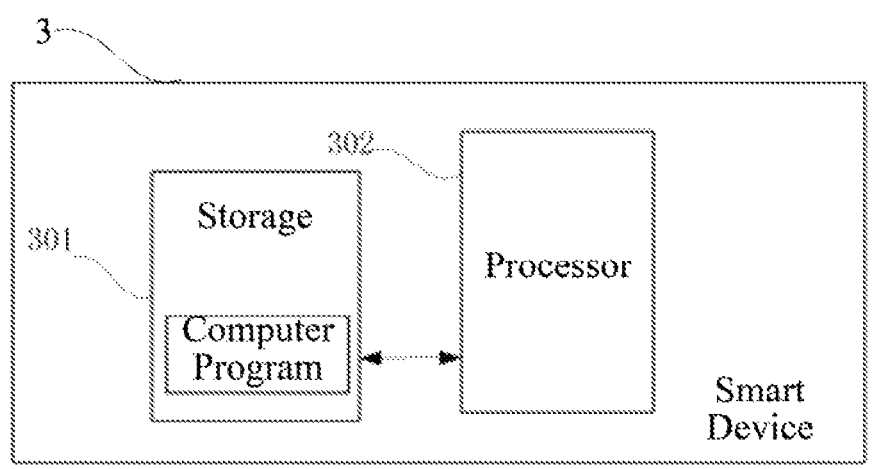
FIG. 3 is a schematic block diagram of an embodiment of a smart device according to the present disclosure.

FIG. 1 is a flow chart of an embodiment of a sentence generation method according to the present disclosure. In this embodiment, a sentence generation method is provided. The method is a computer-implemented method executable for a processor, which may be implemented through and applied to a sentence generation apparatus as shown in FIG. 2, a smart device as shown in FIG. 3, or implemented through a computer readable storage medium. As shown in FIG. 1, the method includes the following steps.

101: obtaining an input sentence.

In this embodiment, the above-mentioned input sentence can be a sentence input by a user, for example, a sentence actively input by a user through text input, voice input, or other input methods. When the smart device is connected to the Internet, the input sentence can also be a sentence randomly captured by the smart device from the Internet. The method for obtaining the input sentence is not limited herein.

102: obtaining a first dependency tree of the input sentence and a second dependency tree of each sentence in a preset corpus, and searching for structurally similar sentence(s) of each input sentence based on a matching degree of the second dependency tree of the sentence and the first dependency tree of the input sentence.

In this embodiment, the above-mentioned structurally similar sentence refers to a sentence having a structure similar to the structure of the above-mentioned input sentence. In one embodiment, in order to improve the efficiency of searching, the research and development personnel can set one corpus in advance, where the corpus contains multiple sentences, and in step 102, it can search the structurally similar sentences of the input sentence in the preset corpus. In this embodiment, in order to obtain the similarity of the structures of different sentences, it can obtain the dependency tree of the above-mentioned input sentence and the dependency tree of each sentence in the preset corpus first, and analyze structural matchness of the sentences in the corpus and the input sentence through the dependency tree.

Specifically, the searching for structurally similar sentence(s) of each input sentence based on a matching degree of the second dependency tree of the sentence and the first dependency tree of the input sentence, including:

A1: obtaining all sub-paths of the dependency tree of the input sentence.

A2: obtaining all sub-paths of the dependency tree of any sentence in the corpus.

In which, the above-mentioned sub-path is a line without a branch that is connected between any amount of adjacent nodes in the dependency tree. As a simple example, for the sentence "my son is playing", the root predicate is the predicate "playing" which is connected with a subject "son" while the subject "son" is connected with the modifier "my", then the dependency tree of this sentence is: playing-son-my.

A3: classifying the sub-paths with a same dependency into a same sub-path category.

In which, the above-mentioned sub-path category refer to a category of sub-paths having the same dependency relationship. For example, in the previous example, the dependency tree of the sentence is "playing-(nsubj)→son-(poss)→my" (the word in the parentheses in the dependency tree is the abbreviations for the corresponding dependency). After splitting the dependency tree, it can obtain three sub-paths of "playing-(nsubj)→son", "son-(poss)→my" and "playing-(nsubj)→son-(poss)→my" which have the corresponding dependencies of "nominal subject" (i.e., "nsubj"), "possession modifier" (i.e., "poss"), and "nominal subject—possession modifie" (i.e., "nsubj-poss"), that is, the sub-path categories of "nsubj", "poss", and "nsubj-poss" can be obtained correspondingly. When a sentence is complex, multiple sub-paths of the same category may appear in its dependency tree. For example, in the sentence "my son and your daughter are playing", the predicate "playing" is used as the root predicate, and it can obtain a sub-path of "nsubj" (i.e., "playing-(nsubj)→son"), two sub-paths of "pass" (i.e., "son-(poss)→my" and "daughter-(poss)→your"), and a sub-path of "nsubj-poss" (i.e., "playing-(nsubj)→son-(poss)→my"), and some other sub-paths. That is, for two sub-paths of the same sub-path category, it is not required that the words of each node on their sub-paths be consistent, but only required that the nodes on the sub-path are connected by the same dependency relationship.

A4: calculating a similarity of the dependency tree of the sentence and the input sentence based on the following formula:

$$S = \sum_{i \in I} count_i(S_1) \times count_i(S_2) / 2^{meanDeep(i)};$$

where, S is the similarity of the dependency tree between two sentences, I is a set of all the sub-paths in the dependency tree of the sentence and the dependency tree of the input sentence, $count_i$ ($S_1$) indicates an amount of occurrences of the sub-paths in the dependency tree of the above-mentioned sentence which belongs to the sub-path category i, the $count_i$ ($S_2$) indicates an amount of occurrences of the sub-paths in the dependency tree of the input sentence which belongs to the sub-path category i, and meanDeep (i) indicates an average distance from the first node of each sub-path in the sub-path category i to a root node of the corresponding dependency tree. In this embodiment, the root node of the above-mentioned dependency tree is obtained through the root predicate of the corresponding sentence, for example, in the sentence "my son is playing", "playing" is the root predicate which can be used as the root predicate, and the distance between the sub-path "playing-son" and the root node "playing" is I; and the distance between the sub-path "son-my" and the root node "playing" is 2.

A5: determining the structurally similar sentence(s) of the input sentence based on the similarity of the dependency tree of each sentence and the dependency tree of the input sentence, where a similarity of the dependency tree of the structurally similar sentence(s) and the dependency tree of the input sentence exceeds a preset similarity threshold.

In which, a similarity threshold can be set in advance herein, and whether the similarity between the dependency tree of each sentence and that of the input sentence exceeds the similarity threshold is determined in turn, and the sentence can be determined as the structurally similar sentence if it is exceeded. In which, the above-mentioned similarity threshold is a fixed empirical value, or can be a value dynamically set by the user based on the number of the structurally similar sentences to be kept this time, which is not limited herein. In one embodiment, if the number of the obtained structurally similar sentences is small, for example, if the number of the structurally similar sentences is less than a preset first amount, the above-mentioned similarity threshold can be reduced based on a preset adjustment parameter, and the structurally similar sentences is determined again based on the reduced similarity threshold. Furthermore, if the number of the obtained structurally similar sentences is large, for example, the number of structurally similar sentences is more than a preset second amount, the first N structurally similar sentences that have higher similarity is filtered in the ascending order of the similarity, where N is a positive integer, which is not limited herein.

103: finding semantically similar sentence(s) of the structurally similar sentence(s).

In this embodiment, after the structurally similar sentences that are relatively similar to the structure of the input sentence are searched out, it can further continue to find the semantically similar sentences that are similar to the semantic of the above-mentioned structurally similar sentences. That is, the sentences that are similar in semantics to the structurally similar sentences but different in sentence structure are founded. In one embodiment, it can find in the corpus. In the process of setting up the corpus in advance, the research and development personnel can associate at least two sentences with similar semantics in advance and manually mark them as synonymous sentences. In this way, in this step, the semantically similar sentences corresponding to the structurally similar sentences can be quickly found directly based on the association relationships of the synonymous sentences that have been marked in the corpus.

104: parsing the input sentence and the structurally similar sentence(s) to obtain a subject block, an object block, and a predicate block of each of the input sentence and the structurally similar sentence(s).

In this embodiment, the above-mentioned analysis includes a dependency parsing performed on the above-mentioned input sentence. By parsing the dependency of the sentence, various sentence components such as subject, predicate, object, modifier, adverbial modifier, and complements that are included in one sentence can be obtained. Furthermore, the sentence is extracted based on the subject obtained by the parsing and the modifiers of the subject, thereby obtaining the subject block of one sentence. Correspondingly, by extracting the sentence based on the object obtained by the parsing and the modifiers of the object, the object block of one sentence can be obtained. The subject block, the object block, and the predicate block of the sentence constitute the key sentence components of the sentence. Specifically, the subject block and the object block of one sentence can be extracted in the manner as follows.

First, for the subject block, it can be determined by assembling each word in the sub-tree which take the subject node as root and then taking the assembled phrase as the subject block. In one embodiment, it queries whether there is a subject-based adjective modification (amod) relationship in the sentence. If there is, it extracts the subject-based adjective modification relationship to obtain a subject block with the subject as a modified phrase. For example, in the sentence "beautiful scenery is what people yearn for", "beautiful" can be used as the subject block with the adjective modification relationship. In another embodiment, it can also query whether there is a subject-based conjunction relationship in the sentence. If there is, the subject-based conjunction relationship is extracted. For example, in the sentence "the cattle and the sheep are both mammals", "the cattle and the sheep" can be used as the subject block with the conjunction relationship. It can also query whether there is a subject-based direct object ("dobj") relationship in the sentence, that is, the whole phrase connected by the "dobj" relationship is taken as the subject block of the sentence. For example, in the sentence "playing basketball is good for your health", "playing basketball" can be taken as a subject block with a "dobj" relationship. Similarly, the subject block in the sentence including a recursive relationship, for example, "my beautiful daughter", can also be obtained in the forgoing manner.

Second, for the object block, its extraction is similar to that of the above-mentioned subject block. That is, it can be determined by assembling each word in the sub-tree which take the object node as root and then taking the assembled phrase as the object block. In one embodiment, it queries whether there is an object-based adjective modification relationship in the sentence. If there is, the object-based adjective modification relationship is extracted to obtain the object block with an object as a modified phrase. For example, in the sentence "people yearn for beautiful scenery", "beautiful scenery" can be used as the object block with the adjective modification relationship. In another embodiment, it can also query whether the sentence has an object based conjunction relationship. If there is, the object-based conjunction relationship is extracted. For example, in the sentence "my teacher criticized me and you", "me and you" can be used as the object block with the conjunction relationship. It can also query whether the sentence has an object-based direct object ("dobj") relationship. That is, the whole phrase connected by the "dobj" relationship is taken as the object block of the sentence, for example, in the sentence "I like to collect stamps", "collect stamp" can be used as the object block with the "dobj" relationship. Similarly, the object block in the sentence including a recursive relationship, for example, "my beautiful daughter", can also be obtained in the forgoing manner.

Through the above-mentioned steps of extracting the subject block and the object block, whenever encountering a complex sentence, it can avoid losing the main content (e.g., modifiability content) of the complex sentence to ensure the integrity of the input sentence. By parsing the above-mentioned input sentences and structurally similar sentences, the subject block, the object block and the predicate block of the input sentence as well as the subject block, the object block and predicate block of the structurally similar sentences can be obtained. In order to facilitate the subsequent sentence rewrites, the subject block of the above-mentioned input sentence can be marked as $S_{input}$, the object block of the above-mentioned input sentence can be marked as $O_{input}$, and the predicate block of the above-mentioned input sentence can be marked as $P_{input}$; the subject block of the structurally similar sentence is marked as $S_{similar}$, the object block of the structurally similar sentence is marked as $O_{similar}$, and the predicate block of the structurally similar sentence is marked as $P_{similar}$.

105: rewriting the semantically similar sentence(s), and generating a new sentence by substituting the subject block $S_{similar}$ in the semantically similar sentences with the subject block in the input sentence $S_{input}$, substituting the object block $O_{similar}$ in the semantically similar sentences with the object block in the input sentence $O_{input}$, and substituting the predicate block $P_{similar}$ in the semantically similar sentences with the predicate block in the input sentence $P_{input}$.

In this embodiment, the relevant content (i.e., the subject block $S_{similar}$, the object block $O_{similar}$, or the predicate block $P_{similar}$) of the semantically similar sentences is substituted with a key sentence component of the above-mentioned input sentence when the relevant content appears in the semantically similar sentences to achieve sentence rewriting so as to obtain the new sentence. In which, since the semantic of one sentence are mainly determined by the object block, the subject block, and the predicate block of the sentence, in order to avoid substitution errors, the above-mentioned step 105 can include:

B1: determining a correspondence between the key sentence component of the above-mentioned structurally similar sentences and the key sentence component of the above-mentioned input sentence;

B2: finding segment(s) in the above-mentioned semantically similar sentence that are expressively consistent with the key sentence component of the above-mentioned structurally similar sentence to use as to-be-substituted segment(s); and B3: substituting the to-be-substituted segment in the above-mentioned semantically similar sentence with the corresponding key sentence component of the above-mentioned input sentence based on the above-mentioned correspondence to generate the new sentence.

In which, although it substitutes the related content of semantically similar sentences, it does not substitute the subject block in the semantically similar sentence with the subject block in the input sentence. Instead, it uses the segment(s) in the semantically similar sentences that are expressively consistent with the key sentence component of the above-mentioned structurally similar sentence to use as the to-be-substituted segment(s), and substitutes the to-be-substituted segment with the corresponding key sentence component of the above-mentioned input sentence based on the predetermined correspondence. In this embodiment, considering that the subject block, the object block, and the predicate block determine the semantic of a sentence, the semantically similar sentences are used as the sentences that are semantically similar to the above-mentioned structurally similar sentence. In the semantically similar sentences, there will usually be the subject block $S_{similar}$, the object block $O_{similar}$, and the predicate block $P_{similar}$ in structurally similar sentences, while the structure of the sentences may change. For example, the input sentence is an active sentence, the subject block is "A", the predicate block is "B", and the object block is "C"; the structurally similar sentences are structurally similar to the input sentence, the subject block is "D", and the predicate block is "E", object block is "F"; the semantically similar sentences are semantically similar to structurally similar sentences, while the structure of the sentence pattern belongs to a passive sentence. The subject block is "F", the predicate block is "E", and the object block is "D". Since the input sentence is structurally similar to the structural similar sentence, it can determine the correspondence of its key sentence component as that the subject block "A" corresponds to "D", the predicate block "B" corresponds to "E", and the object block "C" corresponds to "F". It should be noted that, if the key sentence components of structurally similar sentences are directly substituted, the obtained substituted sentence will be very similar to the previous input sentence, and the substituting will be meaningless. Therefore, in this embodiment, it proposes to rewrite based on semantically similar sentences, where the substituted segment is determined based on the structurally similar sentences, that is, the key sentence component appears in the semantically similar sentences that are parsed from the structurally similar sentences are substituted with the key sentence component parsed from the input sentence. In the above example, the key sentence component "D" contained in the structurally similar sentences is found in the above-mentioned semantically similar sentences, where "D" is the subject block in structurally similar sentences while it is the object block in the semantically similar sentences. That is, in this case, the subject block "D" in the structurally similar sentence also appears as an object block in the semantically similar sentence, and the object block "D" in the semantically similar sentence is substituted with the subject block "A" in the input sentence which corresponds to "D". In the same way, it finds that there are the to-be-substituted segments "E" and "F" in the semantically similar sentences that appear in other structurally similar sentences to substitute "E" and "F" so that the predicate block "E" in the semantically similar sentence is substituted with the predicate block "B" corresponding to "E" in the input sentence, and the subject block "F" in the semantically similar sentence is substituted with the object block "C" corresponding to "F" in the input sentence. Eventually, the new sentence (an active sentence of subject block A-predicate block B-object block C) can be generated based on the input sentence (a passive sentence of subject block A-predicate block B-object block C), the structure of the new sentence is also the structure of the semantically similar sentences, that is, a passive sentence. Since the new sentence is obtained by substituting the related content in the semantically similar sentence based on the key sentence component of the input sentence, the semantic of the new sentence is similar to that of the input sentence.

Through such a method of sentence generation or expansion, multiple new sentences with different paraphrases can be obtained. Under the premise of ensuring the coverage of sentence similarity conversion, it can also improve the type and quantity of the new sentences automatically generated and expanded by the smart device, thereby improving the response speed and user experience of machine language. In addition, in the process of generating new sentences, there is no need to artificially interfere with its operation, which greatly saves the labor cost in the process of sentence generation.

106: filtering the new sentence based on a preset filtering condition.

In this embodiment, since the above-mentioned sentences that are generated through steps 101-105 still need to be understandable, in order to improve the quality of the generated new sentence, it can filter the above-mentioned new sentence based on a preset filtering condition so as to remove the new sentences with grammatical errors and poor quality. In other words, it makes the new sentence to be closer to the language environment of the user, which helps the smart device to reduce the sense of unsmoothness in the subsequent interactions with the user.

107: labeling the filtered new sentence as a semantically similar sentence of the input sentence.

In this embodiment, since the key sentence component of the new sentence is obtained by substituting based on the key sentence component of the input sentence, the semantic of the new sentence is similar to that of the input sentence, that is, the new sentence can be considered as semantically similar to the input sentence. Based on this, after the new sentence is filtered, the retained new sentence can be marked as the semantically similar sentence of the above-mentioned input sentence, and the new sentence, the input sentence, and the marked association relationship of mutually synonymous are stored in the above-mentioned corpus together to realize the update of the corpus.

In the first application scenario, when the new sentence appears with a content word that does not exist in the input sentence, the probability of grammatical errors in the new sentence will increase. Based on this, the above-mentioned step 106 includes:

C1: detecting whether there is a redundant content word in any new sentence;

C2: removing the new sentence, if there is a redundant content word in the new sentence; and C3: retaining the new sentence, if there is no redundant content word in the new sentence.

In which, the redundant content words include nouns, pronouns, adjectives, numerals, adverbs that do not appear in the input sentence. From the historical filtering experience of the new sentence, it can be known that when there is a content word in the new sentence that does not appear in the input sentence, the probability of grammatical errors in the new sentence will increase. Therefore, once a redundant content word appears in the new sentence, the above-mentioned new sentence will be eliminated; otherwise, if there is no redundant content word in the new sentence, the above-mentioned new sentence is retained. In other embodiments, since the above-mentioned new sentence is a synonymous sentence of the input sentence, it can also detect whether the above-mentioned new sentence completely contains the key sentence component of the input sentence. If the above-mentioned new sentence lacks a part of the content of the key sentence component of the above-mentioned input sentence, the new sentence will be removed; if the above-mentioned new sentence completely contains the key sentence component of the input sentence, the new sentence will be retained.

In the second application scenario, it can filter the new sentence through the degree of semantic similarity between the new sentence and the input sentence. Based on this, the above-mentioned step 106 includes:

D1: obtaining a sum of word vectors of any new sentence and a sum of word vectors of the input sentence.

D2: calculating a cosine similarity of the sum of the word vectors of the new sentence and the sum of the word vectors of the input sentence.

D3: sorting all the new sentences according to a descending order of the cosine similarity.

D4: retaining the first $X_1$ new sentences based on a result of the sorting, where $X_1$ is a preset positive integer; detecting whether the cosine similarity being greater than a preset cosine similarity threshold.

In which, the cosine similarity of the sum of the word vectors of the new sentence and the sum of the word vectors of the input sentence indicates the degree of semantic similarity between the above-mentioned new sentence and the above-mentioned input sentence. It is generally believed that the greater the cosine similarity, the higher the degree of semantic similarity between the two sentences; conversely, the lower the cosine similarity, the lower the degree of semantic similarity between the two sentences. Based on this, it can sort the new sentences in a descending order according to the above-mentioned cosine similarity y, so that new sentences with higher cosine similarity to the input sentence are arranged in prior, and those with lower cosine similarity to the input sentence are arranged in posterior. Based on the above-mentioned sorted results, the first $X_1$ new sentences are retained, where $X_1$ is a preset positive integer. The above-mentioned $X_1$ can be set according to the number of the new sentences that the user expects to generate, which can be an empirical value and can also be set according to the number of the new sentences. That is, the above-mentioned $X_1$ can be dynamically changed, and the above-mentioned $X_1$ can have a positive proportional relationship with the total number of the new sentences. When the total number of the new sentences is large, the above-mentioned $X_1$ can be set to a larger value so as to retain relatively more new sentences; and when the total number of the new sentences is small, the above-mentioned $X_1$ is set to a small value to keep relatively fewer new sentences. Furthermore, a cosine similarity threshold can be set in advance to count the number of the new sentences whose cosine similarity is higher than the above-mentioned cosine similarity threshold. The above-mentioned $X_1$ can have a positive proportion to the number of the new sentences that is higher than the cosine similarity threshold, which is not limited herein. In which, the cosine similarity threshold can also be subsequently changed on demands by the user, where the value of the above-mention cosine similarity threshold is not limited herein. In this embodiment, the process of calculating the cosine similarity includes: assuming that the above-mentioned input sentence is composed of m words, and the above-mentioned m words can be processed to obtain the word vectors v1, v2, . . . , Vm; assuming that the new sentence is composed of n words, and the above-mentioned n words can be processed to obtain the word vectors u1, u2, . . . , un; and then the formula of $$\mathrm{cosine}\left(\sum_{i=1}^{m} v_i, \sum_{j=1}^{n} u_j\right)$$

is used to calculate the cosine similarity. In which, the generation process of the above-mentioned word vectors can be trained in advance by the user, which is not limited herein.

In the third application scenario, it can filter the new sentences through the smoothness of the new sentences. Based on this, the above-mentioned step 106 includes:

F1: calculating a perplexity of any new sentence based on a trained language model and a preset perplexity calculation formula, where the perplexity indicating a fluency degree of one sentence is calculated using a formula of:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i \mid w_1 w_2 \ldots w_{i-1})}};$$

where, $S_{new}$ indicates a new sentence, M is the length of the new sentence $S_{new}$, p ($w_i$) is a probability of the i-th word in the new sentence $S_{new}$, and the probability is obtained based on the language model.

F2: sorting the new sentences according to an ascending order of the perplexity.

F3: retaining the first $X_2$ new sentences based on a result of the sorting, where $X_2$ is a preset positive integer.

In which, the above-mentioned perplexity indicates the degree of the fluency of one sentence. It is generally believed that the greater the perplexity i, the lower the degree of fluency of the sentence i; conversely, the smaller the perplexity is, the higher the degree of fluency of the sentence is. Based on this, a perplexity threshold can be set in advance to use as a criterion for determining whether the new sentence is fluent. In other embodiment, the above-mentioned perplexity threshold can also be subsequently changed by the user according to requirements, and the value of the above-mentioned perplexity threshold is not limited herein. In one embodiment, the above-mentioned trained language model can be a long short-term memory (LSTM) language model trained according to the collected question corpus. For the LSTM language model, the format of the input data is spliced by the words vector each word token inputted into the model is embedded as a vector, and the output data is the conditional-probability of the appearing of the next word that is determined by previous words given in the input data. The above-mentioned LSTM language model is used to calculate the perplexity of the new sentence to evaluate the fluency of the new sentence, thereby realizing the filtering of the new sentences that do not conform to the grammatical specification. Considering that it is difficult to set a uniform standard on the setting of the threshold of the perplexity, after calculating the perplexity of each new sentence, the above-mentioned new sentences can be sorted in an ascending order based on the perplexity to retain the sentences that are in the front after sorting and present to the user in this order. In other embodiment, it can also perform intelligent filtering through the smart device based on the perplexity, and after sorting the above-mentioned new sentences in an ascending order based on the perplexity, the first $X_2$ new sentences can be retained based on the above-mentioned sorting results, where $X_2$ is a preset positive integer. The above-mentioned $X_2$ can be set according to the number of the new sentences that the user expects to generate, can be an empirical value, and can also be set according to the number of the generated new sentences. That is, the above-mentioned $X_2$ can be dynamically changed, and the above-mentioned $X_2$ can have a positive proportional relationship with the total number of the new sentences. When the total number of the new sentences is large, the above-mentioned $X_2$ can be set to a larger value so as to retain relatively more new sentences; and when the total number of the new sentences is small, the above-mentioned $X_2$ is set to a small value to keep relatively fewer new sentences. Furthermore, it can set a perplexity threshold in advance, and the number of new sentences with the perplexity fewer than the above-mentioned perplexity threshold, where the above-mentioned $X_2$ can be in a positive proportional relationship with the number of the new sentences below the perplexity threshold, which is not limited herein. In which, the above-mentioned perplexity threshold can also be subsequently changed on demands by the user, where the value of the above-mention cosine similarity threshold is not limited herein.

It should be noted that, the filtering methods provided in the above-mentioned three application scenarios can be executed individually, or be executed in combination. For example, it can first perform a first level filtering on the new sentences through the filtering method provided by the first application scenario based on redundant content words (and/or the key sentence component of the input sentence), then perform a second level filtering on the new sentences retained after the first level filtering based on the degree of semantic similarity indicated by the cosine similarity through the filtering method provided by the second application scenario, and finally perform a third level filtering on the new sentences retained after the second level filtering based on the degree of sentence fluency indicated by the perplexity through the filtering method provided by the third application scenario. In which, only the new sentences that passed the first level filtering, the second level filtering, and the third level filtering can be stored in the above-mentioned corpus. Furthermore, after the first-level filtering, the second-level filtering, and the third-level filtering, the manual filtering step can be added so that the user can make final checks.

As can be seen from the above, in this embodiment, it can first search out the structurally similar sentences with the structure of the sentence pattern similar to that of the input sentence through the dependency tree of the input sentence, and then find the semantically similar sentences with the semantic similar to the structurally similar sentences, and finally substitute the related content of the semantically similar sentence, so that the sentence structure of the eventually generated new sentences retains the sentence structure of the semantically similar sentence before substituting, while the semantic is similar to the semantic of the input sentence, thereby realizing the intelligent generation of the sentence without manually editing the semantically similar sentences. It can be expected that, when the user interacts with a smart device such as a robot, the smart device can expand every sentence of the user multiple times quickly to obtain plentiful sentences, thereby improving the response speed of the machine language and the user experience. Furthermore, after the new sentence is generated, it can filter the new sentences in various ways to avoid the sentences with grammatical errors or having the semantic not similar to that of the input sentence to be stored in the corpus, which can improve the smoothness and entertainingness of the smart device to subsequently interaction with the user, while provides the foundation for the dynamic intelligent expansion of the corpus, and provides more possibilities for the subsequent generation of the new sentences.

It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment Two

FIG. 2 is a schematic block diagram of an embodiment of a sentence generation apparatus according to the present disclosure. A sentence generation apparatus is provided. The sentence generation apparatus can be integrated into a smart device. As shown in FIG. 2, in this embodiment, a sentence generation apparatus 200 includes:

an obtaining unit 201 configured to obtain an input sentence;

a searching unit 202 configured to obtain a first dependency tree of the input sentence and a second dependency tree of each sentence in a preset corpus, and searching for one or more structurally similar sentences of each input sentence based on a matching degree of the second dependency tree of the sentence and the first dependency tree of the input sentence, where the one or more structurally similar sentences are structurally similar to the input sentence;

a finding unit 203 configured to find one or more semantically similar sentences of the one or more structurally similar sentences;

a parsing unit 204 configured to parse the input sentence and the one or more structurally similar sentences to obtain a subject block, an object block, and a predicate block of each of the input sentence and the one or more structurally similar sentences, where the subject block is obtained by extracting each sentence based on a subject of the sentence and a dependency of the subject, and the object block is obtained by extracting each sentence based on an object of the sentence and a dependency of the object, where the subject block of the input sentence is marked as $S_{input}$, and the object block of the input sentence is marked as $O_{input}$, the predicate block of the input sentence is marked as $P_{input}$, the subject block of the structurally similar sentence is marked as $S_{similar}$, the object block of the structurally similar sentence is marked as $O_{similar}$, and the predicate block of the structurally similar sentence is marked as $P_{similar}$;

a substituting unit 205 configured to rewrite the one or more semantically similar sentences, and generate a new sentence by substituting the subject block in the semantically similar sentences with the subject block in the input sentence, substituting the object block in the semantically similar sentences with the object block in the input sentence, and substituting the predicate block in the semantically similar sentences with the predicate block in the input sentence;

a filtering unit 206 configured to filter the new sentence based on a preset filtering condition; and a labeling unit 207 configured to label the filtered new sentence as a semantically similar sentence of the input sentence.

In one embodiment, the searching unit 202 includes:

a sub-path obtaining subunit configured to obtain all sub-paths of the dependency tree of the input sentence, and obtain all sub-paths of the dependency tree of any sentence in the corpus, where each sub-path is a line without a branch formed between any amount of adjacent nodes in the dependency tree;

a category classifying subunit configured to classify the sub-paths with a same dependency into a same sub-path category; and a similarity calculating subunit configured to calculate a similarity of the dependency tree of the sentence and the input sentence based on the following formula:

$$S = \sum_{i \in I} \text{count}_i(S_1) \times \text{count}_i(S_2)/2^{meanDeep(i)};$$

where, I is a set of all the sub-paths in the dependency tree of the sentence and the dependency tree of the input sentence, $\text{count}_i(S_1)$ indicates an amount of occurrences of the sub-paths in the dependency tree of the sentence and belonging to the sub-path category i, the $\text{count}_i(S_2)$ indicates an amount of occurrences of the sub-paths in the dependency tree of the input sentence and belonging to the sub-path category i, and meanDeep (i) indicates an average distance from a first node of each sub-path in the sub-path category i to a root node of the corresponding dependency tree; and a structurally similar sentence determining subunit configured to determine the one or more structurally similar sentence of the input sentence based on the similarity of the dependency tree of each sentence and the dependency tree of the input sentence, where a similarity of the dependency tree of the one or more structurally similar sentence and the dependency tree of the input sentence exceeds a preset similarity threshold.

In one embodiment, the filtering unit 206 includes:

a first detection subunit configured to detect whether there is a redundant content word in any new sentence, where the redundant content word is a content word not exist in the input sentence;

a first excluding sub-unit configured to exclude the new sentence in response to there being the redundant content word in the new sentence; and a first retaining subunit configured to retain the new sentence in response to there being no redundant content word in the new sentence.

In one embodiment, the filtering unit 206 includes:

a word vector sum obtaining subunit configured to obtain a sum of word vectors of any new sentence and a sum of word vectors of the input sentence;

a cosine similarity calculation subunit configured to calculate a cosine similarity of the sum of the word vectors of the new sentence and the sum of the word vectors of the input sentence;

a first sorting subunit configured to sort all the new sentences according to a descending order of the cosine similarity; and a second retaining subunit configured to retain the first $X_1$ new sentences based on a result of the sorting, where $X_1$ is a preset positive integer.

In one embodiment, the filtering unit 206 includes:

perplexity calculation subunit configured to calculate a perplexity of any new sentence based on a trained language model and a preset perplexity calculation formula, where the perplexity indicating a fluency degree of one sentence is calculated using a formula of:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i \mid w_1 w_2 \ldots w_{i-1})}} \ ;$$

where, $S_{new}$ indicates a new sentence, M is the length of the new sentence $S_{new}$, $p(w_i)$ is a probability of the i-th word in the new sentence $S_{new}$, and the probability is obtained based on the language model;

a second sorting subunit configured to sort the new sentences according to an ascending order of the perplexity; and a third retaining subunit configured to retain the first $X_2$ new sentences based on a result of the sorting, where $X_2$ is a preset positive integer.

In one embodiment, the filtering unit 206 is configured to filter the new sentence based on content words in the new sentence, a cosine similarity between the new sentence and the input sentence, and a perplexity of the new sentence in order. And correspondingly, the word vector sum obtaining subunit processes the new sentence retained by the first retaining subunit, and the perplexity calculation subunit processes the new sentence retained by the second retaining subunit.

As can be seen from the above, in this embodiment, the sentence generation apparatus can first search out the structurally similar sentences with the structure of the sentence pattern similar to that of the input sentence through the dependency tree of the input sentence, and then find the semantically similar sentences with the semantic similar to the structurally similar sentences, and finally substitute the related content of the semantically similar sentence, so that the sentence structure of the eventually generated new sentences retains the sentence structure of the semantically similar sentence before substituting, while the semantic is similar to the semantic of the input sentence, thereby realizing the intelligent generation of the sentence without manually editing the semantically similar sentences. It can be expected that, when the user interacts with a smart device such as a robot, the smart device can expand every sentence of the user multiple times quickly to obtain plentiful sentences, thereby improving the response speed of the machine language and the user experience. Furthermore, after the new sentence is generated, it can filter the new sentences in various ways to avoid the sentences with grammatical errors or having the semantic not similar to that of the input sentence to be stored in the corpus, which can improve the smoothness and entertainingness of the smart device to subsequently interaction with the user, while provides the foundation for the dynamic intelligent expansion of the corpus, and provides more possibilities for the subsequent generation of the new sentences.

In this embodiment, each of the above-mentioned modules/units is implemented in the form of software, which can be computer program(s) stored in a memory of the sentence generation apparatus and executable on a processor of the sentence generation apparatus. In other embodiments, each of the above-mentioned modules/units may be implemented in the form of hardware (e.g., a circuit of the sentence generation apparatus which is coupled to the processor of the sentence generation apparatus) or a combination of hardware and software (e.g., a circuit with a single chip microcomputer).

Embodiment Three

FIG. 3 is a schematic block diagram of an embodiment of a smart device according to the present disclosure. A smart device apparatus is provided. As shown in FIG. 3, in this embodiment, a smart device 3 includes a storage 301, one or more processors 302 (only one is shown in FIG. 3), and a computer program stored in the storage 301 and executable on a processor. In which, the storage 301 is for storing software programs and modules, the processor 302 executes various functional applications and performs data processing by executing the software programs and units stored in the storage 301 to obtain resources corresponding to preset events. Specifically, the processor 302 implements the following steps by executing the above-mentioned computer program stored in the storage 301:

obtaining an input sentence;

obtaining a first dependency tree of the input sentence and a second dependency tree of each sentence in a preset corpus, and searching for one or more structurally similar sentences of each input sentence based on a matching degree of the second dependency tree of the sentence and the first dependency tree of the input sentence, where the one or more structurally similar sentences are structurally similar to the input sentence;

finding one or more semantically similar sentences of the one or more structurally similar sentences;

parsing the input sentence and the one or more structurally similar sentences to obtain a subject block, an object block, and a predicate block of each of the input sentence and the one or more structurally similar sentences, where the subject block is obtained by extracting each sentence based on a subject of the sentence and a dependency of the subject, and the object block is obtained by extracting each sentence based on an object of the sentence and a dependency of the object;

rewriting the one or more semantically similar sentences, and generating a new sentence by substituting the subject block in the semantically similar sentences with the subject block in the input sentence, substituting the object block in the semantically similar sentences with the object block in the input sentence, and substituting the predicate block in the semantically similar sentences with the predicate block in the input sentence;

filtering the new sentence based on a preset filtering condition; and labeling the filtered new sentence as a semantically similar sentence of the input sentence.

Assuming the forgoing is the first possible embodiment, in the second possible embodiment provided based on the first possible embodiment, the step of searching for the one or more structurally similar sentences of each input sentence based on the matching degree of the second dependency tree of the sentence and the first dependency tree of the input sentence includes:

obtaining all sub-paths of the dependency tree of the input sentence, where each sub-path is a line without a branch formed between any amount of adjacent nodes in the dependency tree;

obtaining all sub-paths of the dependency tree of any sentence in the corpus;

classifying the sub-paths with a same dependency into a same sub-path category; and calculating a similarity of the dependency tree of the sentence and the input sentence based on the following formula:

$$S = \sum_{i \in I} \text{count}_i(S_1) \times \text{count}_i(S_2)/2^{meanDeep(i)};$$

where, I is a set of all the sub-paths in the dependency tree of the sentence and the dependency tree of the input sentence, $\text{count}_i(S_i)$ indicates an amount of occurrences of the sub-paths in the dependency tree of the sentence and belonging to the sub-path category i, the $\text{count}_i(S_2)$ indicates an amount of occurrences of the sub-paths in the dependency tree of the input sentence and belonging to the sub-path category i, and meanDeep (i) indicates an average distance from a first node of each sub-path in the sub-path category i to a root node of the corresponding dependency tree; and determine the one or more structurally similar sentence of the input sentence based on the similarity of the dependency tree of each sentence and the dependency tree of the input sentence, where a similarity of the dependency tree of the one or more structurally similar sentence and the dependency tree of the input sentence exceeds a preset similarity threshold;

determining the one or more structurally similar sentences of the input sentence based on the similarity of the dependency tree of each sentence and the dependency tree of the input sentence, where the one or more structurally similar sentence are one or more of the sentences in the corpus having the dependency tree with a similarity with the dependency tree of the input sentence exceeding a preset similarity threshold.

In the third possible embodiment based on the above-mentioned first possible embodiment or the above-mentioned second possible embodiment, the step of filtering the new sentence based on the preset filtering condition includes:

detecting whether there is a redundant content word in any new sentence, where the redundant content word is a content word not exist in the input sentence;

excluding the new sentence in response to there being the redundant content word in the new sentence; and retaining the new sentence in response to there being no redundant content word in the new sentence.

In the fourth possible embodiment based on the above-mentioned first possible embodiment or the above-mentioned second possible embodiment, the step of filtering the new sentence based on the preset filtering condition includes:

obtaining a sum of word vectors of any new sentence and a sum of word vectors of the input sentence;

calculating a cosine similarity of the sum of the word vectors of the new sentence and the sum of the word vectors of the input sentence;

sorting all the new sentences according to a descending order of the cosine similarity; and retaining the first $X_1$ new sentences based on a result of the sorting, where $X_1$ is a preset positive integer.

In the fifth possible embodiment based on the above-mentioned first possible embodiment or the above-mentioned second possible embodiment, the step of filtering the new sentence based on the preset filtering condition includes:

calculating a perplexity of any new sentence based on a trained language model and a preset perplexity calculation formula, where the perplexity indicating a fluency degree of one sentence is calculated using a formula of:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i \mid w_1 w_2 \ldots w_{i-1})}};$$

where, $S_{new}$ indicates a new sentence, M is the length of the new sentence $S_{new}$, $p(w_i)$ is a probability of the i-th word in the new sentence $S_{new}$, and the probability is obtained based on the language model;

sorting the new sentences according to an ascending order of the perplexity; and retaining the first $X_2$ new sentences based on a result of the sorting, where $X_2$ is a preset positive integer.

In the sixth possible embodiment based on the above-mentioned first possible embodiment or the above-mentioned second possible embodiment, the step of filtering the new sentence based on the preset filtering condition includes:

filtering the new sentence based on content words in the new sentence, a cosine similarity between the new sentence and the input sentence, and a perplexity of the new sentence in order;

where, the step of filtering the new sentence based on the nouns in the new sentence includes:

detecting whether there is a redundant content word in any new sentence, where the redundant content word is a content word not exist in the input sentence;

excluding the new sentence in response to there being the redundant content word in the new sentence; and retaining the new sentence in response to there being no redundant content word in the new sentence;

where, the step of filtering the new sentence based on the cosine similarity between the new sentence and the input sentence includes:

obtaining a sum of word vectors of the new sentence retained after filtering the new sentences based on the nouns in the new sentence and a sum of word vectors of the input sentence;

calculating a cosine similarity of the sum of the word vectors of the new sentence and the sum of the word vectors of the input sentence;

sorting all the new sentences according to a descending order of the cosine similarity; and retaining the first $X_3$ new sentences based on a result of the sorting, where $X_3$ is a preset positive integer;

where, the step of filtering the new sentence based on the perplexity of the new sentence includes:

calculating a perplexity of the new sentence retained after filtering based on the cosine similarity of the new sentence and the input sentence based on a trained language model and a preset perplexity calculation formula, where the perplexity indicating a fluency degree of one sentence is as follows:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i \mid w_1 w_2 \ldots w_{i-1})}} \; ;$$

where, $S_{new}$ indicates a new sentence, M is the length of the new sentence $S_{new}$, $p(w_i)$ is a probability of the i-th word in the new sentence $S_{new}$, and the probability is obtained based on the language model;

sorting the new sentences according to an ascending order of the perplexity; and retaining the first $X_4$ new sentences based on a result of the sorting, where $X_4$ is a preset positive integer, and $X_4$ is smaller than $X_3$.

It should be understood that, in this embodiment, the processor 302 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 301 can include read only memory and random access memory and provides instructions and data to the processor 302. A portion or entire of the storage 301 can also include a non-volatile random access memory. For example, the storage 301 can also store information of the device type.

As can be seen from the above, in this embodiment, the smart device can first search out the structurally similar sentences with the structure of the sentence pattern similar to that of the input sentence through the dependency tree of the input sentence, and then find the semantically similar sentences with the semantic similar to the structurally similar sentences, and finally substitute the related content of the semantically similar sentence, so that the sentence structure of the eventually generated new sentences retains the sentence structure of the semantically similar sentence before substituting, while the semantic is similar to the semantic of the input sentence, thereby realizing the intelligent generation of the sentence without manually editing the semantically similar sentences. It can be expected that, when the user interacts with a smart device such as a robot, the smart device can expand every sentence of the user multiple times quickly to obtain plentiful sentences, thereby improving the response speed of the machine language and the user experience. Furthermore, after the new sentence is generated, it can filter the new sentences in various ways to avoid the sentences with grammatical errors or having the semantic not similar to that of the input sentence to be stored in the corpus, which can improve the smoothness and entertainingness of the smart device to subsequently interaction with the user, while provides the foundation for the dynamic intelligent expansion of the corpus, and provides more possibilities for the subsequent generation of the new sentences.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the above-mentioned device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of software on external device and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device) and method may be implemented in other manners. For example, the above-mentioned apparatus embodiment is merely exemplary. For example, the division of the above-mentioned modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The above-mentioned units described as separate components may or may not be physically separated. The components represented as units may or may not be physical units, that is, may be located in one place or be distributed to multiple network units. Some or all of the units may be selected according to actual needs to achieve the objectives of this embodiment.

When the above-mentioned integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The above-mentioned computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently substituted, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented sentence generation method, comprising executing on a processor steps of:
    obtaining an input sentence;
    obtaining a first dependency tree of the input sentence and a second dependency tree of each sentence in a preset corpus, and searching for one or more structurally similar sentences of the input sentence based on a matching degree of the second dependency tree of the each sentence in the corpus and the first dependency tree of the input sentence, wherein the one or more structurally similar sentences are structurally similar to the input sentence;
    finding one or more semantically similar sentences of the one or more structurally similar sentences;
    parsing the input sentence and the one or more structurally similar sentences to obtain a subject block, an object block, and a predicate block of each of the input sentence and the one or more structurally similar sentences, wherein the subject block is obtained by extracting each sentence based on a subject of the sentence and a dependency of the subject, and the object block is obtained by extracting each sentence based on an object of the sentence and a dependency of the object;
    rewriting each of the one or more semantically similar sentences to generate at least one new sentence, by substituting the subject block in the each of the one or more semantically similar sentences with the subject block in the input sentence, substituting the object block in the each of the one or more semantically similar sentences with the object block in the input sentence, and substituting the predicate block in the each of the one or more semantically similar sentences with the predicate block in the input sentence;
    filtering the at least one new sentence based on a preset filtering condition; and
    labeling the at least one filtered sentence as a semantically similar sentence of the input sentence.

2. The method of claim 1, wherein the step of searching for the one or more structurally similar sentences of the input sentence based on the matching degree of the second dependency tree of the each sentence in the corpus and the first dependency tree of the input sentence comprises:
    obtaining all sub-paths of the first dependency tree of the input sentence, wherein each sub-path is a line without a branch formed between any amount of adjacent nodes in the first dependency tree;
    obtaining all sub-paths of the second dependency tree of any sentence in the corpus;
    classifying the sub-paths with a same dependency into a same sub-path category; and
    calculating a similarity of the second dependency tree of the each sentence in the corpus and the first dependency tree of the input sentence based on the following formula:

$$S = \sum_{i \in I} \text{count}_i(S_1) \times \text{count}_i(S_2)/2^{meanDeep(i)};$$

where, I is a set of all the sub-paths in the second dependency tree of the each sentence in the corpus and the first dependency tree of the input sentence, $\text{count}_i(S_1)$ indicates an amount of occurrences of the sub-paths in the second dependency tree of the each sentence in the corpus and belonging to the sub-path category i, the $\text{count}_i(S_2)$ indicates an amount of occurrences of the sub-paths in the first dependency tree of the input sentence and belonging to the sub-path category i, and meanDeep (i) indicates an average distance from a first node of each sub-path in the sub-path category i to a root node of the corresponding dependency tree; and
    determining the one or more structurally similar sentences of the input sentence based on the similarity of the second dependency tree of the each sentence in the corpus and the first dependency tree of the input sentence, wherein the one or more structurally similar sentences are one or more of the sentences in the corpus having the second dependency tree with a similarity with the first dependency tree of the input sentence exceeding a preset similarity threshold.

3. The method of claim 2, wherein when a number of the one or more structurally similar sentences is less than a preset first amount, the preset similarity threshold is reduced based on a preset adjustment parameter; and when the number of the one or more structurally similar sentences is more than a preset second amount, the one or more structurally similar sentences are filtered in a ascending order of the similarity.

4. The method of claim 1, wherein the step of filtering the at least one new sentence based on the preset filtering condition comprises:

detecting whether there is a redundant content word in any new sentence, wherein the redundant content word is a content word not exist in the input sentence;

excluding the new sentence in response to there being the redundant content word in the new sentence; and retaining the new sentence in response to there being no redundant content word in the new sentence.

5. The method of claim 1, wherein the step of filtering the at least one new sentence based on the preset filtering condition comprises:

obtaining a sum of word vectors of any new sentence and a sum of word vectors of the input sentence;

calculating a cosine similarity of the sum of the word vectors of the new sentence and the sum of the word vectors of the input sentence;

sorting all the new sentences according to a descending order of the cosine similarity; and retaining the first $X_1$ new sentences based on a result of the sorting, wherein $X_1$ is a preset positive integer.

6. The method of claim 5, wherein $X_1$ has a positive proportional relationship with a total number of the at least one new sentence; or wherein $X_1$ has a positive proportion to a number of new sentences with the cosine similarity higher than a cosine similarity threshold.

7. The method of claim 1, wherein the step of filtering the at least one new sentence based on the preset filtering condition comprises:

calculating a perplexity of any new sentence based on a trained language model and a preset perplexity calculation formula, wherein the perplexity indicating a fluency degree of one sentence is calculated using a formula of:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i | w_1 w_2 \ldots w_{i-1})}};$$

where, $S_{new}$ indicates a new sentence, M is the length of the new sentence $S_{new}$, p($w_i$) is a probability of the i-th word in the new sentence $S_{new}$, and the probability is obtained based on the language model;

sorting the new sentences according to an ascending order of the perplexity; and retaining the first $X_2$ new sentences based on a result of the sorting, wherein $X_2$ is a preset positive integer.

8. The method of claim 7, wherein wherein $X_2$ has a positive proportional relationship with a total number of the at least one new sentence; or wherein $X_2$ is in a positive proportional relationship with a number of new sentences with the perplexity below a perplexity threshold.

9. The method of claim 1, wherein the step of filtering the at least one new sentence based on the preset filtering condition comprises:

filtering the at least one new sentence based on content words in the at least one new sentence, a cosine similarity between each of the at least one new sentence and the input sentence, and a perplexity of each of the at least one new sentence in order;

wherein, the step of filtering the at least one new sentence based on the content words in the at least one new sentence comprises:

detecting whether there is a redundant content word in any new sentence, wherein the redundant content word is a content word not exist in the input sentence;

excluding the new sentence in response to there being the redundant content word in the new sentence; and retaining the new sentence in response to there being no redundant content word in the new sentence;

wherein, the step of filtering the at least one new sentence based on the cosine similarity between the each of the at least one new sentence and the input sentence comprises:

obtaining a sum of word vectors of the new sentence retained after filtering the new sentences based on the content words in the at least one new sentence and a sum of word vectors of the input sentence;

calculating a cosine similarity of the sum of the word vectors of the new sentence and the sum of the word vectors of the input sentence;

sorting all the new sentences according to a descending order of the cosine similarity; and retaining the first $X_3$ new sentences based on a result of the sorting, wherein $X_3$ is a preset positive integer;

wherein, the step of filtering the at least one new sentence based on the perplexity of the each of the at least one new sentence comprises:

calculating a perplexity of the new sentence retained after filtering based on the cosine similarity of the new sentence and the input sentence based on a trained language model and a preset perplexity calculation formula, wherein the perplexity indicating a fluency degree of one sentence is as follows:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i | w_1 w_2 \ldots w_{i-1})}};$$

where, $S_{new}$ indicates a new sentence, M is the length of the new sentence $S_{new}$, p(w) is a probability of the i-th word in the new sentence $S_{new}$, and the probability is obtained based on the language model;

sorting the new sentences according to an ascending order of the perplexity; and retaining the first $X_4$ new sentences based on a result of the sorting, wherein $X_4$ is a preset positive integer, and $X_4$ is smaller than $X_3$.

10. The method of claim 1, wherein the subject block is obtained based on a subject-based adjective modification relationship, a subject-based conjunction relationship, or a subject-based direct object relationship in the sentence; and the object block is obtained based on an object-based adjective modification relationship, an object based conjunction relationship, or an object-based direct object relationship.

11. The method of claim 1, wherein the each of the one or more semantically similar sentences is rewritten based on correspondences between the subject block, the object block, and the predicate block of the each of one or more structurally similar sentences, and the subject block, the object block, and the predicate block of the input sentence.

12. The method of claim 11, wherein the step of rewriting the each of the one or more semantically similar sentences to generate the at least one new sentence comprises:

determining a correspondence between a key sentence component of the each of the one or more structurally similar sentences and a key sentence component of the input sentence, wherein the key sentence component comprises the subject block, the object block, and the predicate block;

finding segments in the each of the one or more semantically similar sentences that are expressively consistent with the key sentence component of the each of the one or more structurally similar sentence to use as to-be-substituted segments; and substituting the to-be-substituted segments in the each of the one or more semantically similar sentences with the corresponding key sentence component of the input sentence based on the correspondence, to generate the at least one new sentence.

13. A sentence generation apparatus, comprising:

an obtaining unit configured to obtain an input sentence;

a searching unit configured to obtain a first dependency tree of the input sentence and a second dependency tree of each sentence in a preset corpus, and search for one or more structurally similar sentences of the input sentence based on a matching degree of the second dependency tree of the each sentence in the corpus and the first dependency tree of the input sentence, wherein the one or more structurally similar sentences are structurally similar to the input sentence;

a finding unit configured to find one or more semantically similar sentences of the one or more structurally similar sentences;

a parsing unit configured to parse the input sentence and the one or more structurally similar sentences to obtain a subject block, an object block, and a predicate block of each of the input sentence and the one or more structurally similar sentences, wherein the subject block is obtained by extracting each sentence based on a subject of the sentence and a dependency of the subject, and the object block is obtained by extracting each sentence based on an object of the sentence and a dependency of the object;

a substituting unit configured to rewrite each of the one or more semantically similar sentences to generate at least one new sentence, by substituting the subject block in the each of the one or more semantically similar sentences with the subject block in the input sentence, substituting the object block in the each of the one or more semantically similar sentences with the object block in the input sentence, and substituting the predicate block in the each of the one or more semantically similar sentences with the predicate block in the input sentence;

a filtering unit configured to filter the at least one new sentence based on a preset filtering condition; and a labeling unit configured to label at least one the filtered new sentence as a semantically similar sentence of the input sentence.

14. The apparatus of claim 13, wherein the searching unit comprises:

a sub-path obtaining subunit configured to obtain all sub-paths of the first dependency tree of the input sentence, and all sub-paths of the second dependency tree of any sentence in the corpus, wherein each sub-path is a line without a branch formed between any amount of adjacent nodes in the first dependency tree;

a category classifying subunit configured to classify the sub-paths with a same dependency into a same sub-path category; and a similarity calculating subunit configured to calculate a similarity of the second dependency tree of the each sentence in the corpus and the first dependency tree of the input sentence based on the following formula:

$$S = \sum_{i \in I} \text{count}_i(S_1) \times \text{count}_i(S_2)/2^{meanDeep(i)};$$

where, I is a set of all the sub-paths in the second dependency tree of the each sentence in the corpus and the first dependency tree of the input sentence, $\text{count}_i(S_1)$ indicates an amount of occurrences of the sub-paths in the second dependency tree of the each sentence in the corpus and belonging to the sub-path category i, the $\text{count}_i(S_2)$ indicates an amount of occurrences of the sub-paths in the first dependency tree of the input sentence and belonging to the sub-path category i, and meanDeep (i) indicates an average distance from a first node of each sub-path in the sub-path category i to a root node of the corresponding dependency tree; and a structurally similar sentence determining subunit configured to determine the one or more structurally similar sentences of the input sentence based on the similarity of the second dependency tree of the each sentence in the corpus and the first dependency tree of the input sentence, where a similarity of the second dependency tree of each of the one or more structurally similar sentences and the first dependency tree of the input sentence exceeds a preset similarity threshold.

15. A smart device, comprising:

a memory;

a processor; and one or more computer programs stored in the memory and executable on the processor, wherein the one or more computer programs comprise:

instructions for obtaining an input sentence;

instructions for obtaining a first dependency tree of the input sentence and a second dependency tree of each sentence in a preset corpus, and searching for one or more structurally similar sentences of the input sentence based on a matching degree of the second dependency tree of the each sentence in the corpus and the first dependency tree of the input sentence, wherein the one or more structurally similar sentences are structurally similar to the input sentence;

instructions for finding one or more semantically similar sentences of the one or more structurally similar sentences;

instructions for parsing the input sentence and the one or more structurally similar sentences to obtain a subject block, an object block, and a predicate block of each of the input sentence and the one or more structurally similar sentences, wherein the subject block is obtained by extracting each sentence based on a subject of the sentence and a dependency of the subject, and the object block is obtained by extracting each sentence based on an object of the sentence and a dependency of the object;

instructions for rewriting each of the one or more semantically similar sentences to generate at least one new sentence, by substituting the subject block in the each of the one or more semantically similar sentences with the subject block in the input sentence, substituting the object block in the each of the one or more semantically similar sentences with the object block in the input sentence, and substituting the predicate block in the each of the one or more semantically similar sentences with the predicate block in the input sentence;

instructions for filtering the at least one new sentence based on a preset filtering condition; and instructions for labeling the at least one filtered new sentence as a semantically similar sentence of the input sentence.

16. The smart device of claim 15, wherein the instructions for searching for the one or more structurally similar sentences of the input sentence based on the matching degree of the second dependency tree of the each sentence in the corpus and the first dependency tree of the input sentence comprise:

instructions for obtaining all sub-paths of the first dependency tree of the input sentence, wherein each sub-path is a line without a branch formed between any amount of adjacent nodes in the first dependency tree;

instructions for obtaining all sub-paths of the second dependency tree of any sentence in the corpus;

instructions for classifying the sub-paths with a same dependency into a same sub-path category; and instructions for calculating a similarity of the second dependency tree of the each sentence in the corpus and the first dependency tree of the input sentence based on the following formula:

$$S = \sum_{i \in I} \text{count}_i(S_1) \times \text{count}_i(S_2)/2^{meanDeep(i)};$$

where, I is a set of all the sub-paths in the second dependency tree of the each sentence in the corpus and the first dependency tree of the input sentence, $\text{count}_i(S_1)$ indicates an amount of occurrences of the sub-paths in the second dependency tree of the each sentence in the corpus and belonging to the sub-path category i, the $\text{count}_i(S_2)$ indicates an amount of occurrences of the sub-paths in the first dependency tree of the input sentence and belonging to the sub-path category i, and meanDeep (i) indicates an average distance from a first node of each sub-path in the sub-path category i to a root node of the corresponding dependency tree; and instructions for determining the one or more structurally similar sentences of the input sentence based on the similarity of the second dependency tree of the each sentence in the corpus and the first dependency tree of the input sentence, wherein the one or more structurally similar sentences are one or more of the sentences in the corpus having the second dependency tree with a similarity with the first dependency tree of the input sentence exceeding a preset similarity threshold.

17. The smart device of claim 15, wherein the instructions for filtering the at least one new sentence based on the preset filtering condition comprise:

instructions for detecting whether there is a redundant content word in any new sentence, wherein the redundant content word is a content word not exist in the input sentence;

instructions for excluding the new sentence in response to there being the redundant content word in the new sentence; and instructions for retaining the new sentence in response to there being no redundant content word in the new sentence.

18. The smart device of claim 15, wherein the instructions for filtering the at least one new sentence based on the preset filtering condition comprise:

instructions for obtaining a sum of word vectors of any new sentence and a sum of word vectors of the input sentence;

instructions for calculating a cosine similarity of the sum of the word vectors of the new sentence and the sum of the word vectors of the input sentence;

instructions for sorting all the new sentences according to a descending order of the cosine similarity; and instructions for retaining the first $X_1$ new sentences based on a result of the sorting, wherein $X_1$ is a preset positive integer.

19. The smart device of claim 15, wherein the instructions for filtering the at least one new sentence based on the preset filtering condition comprise:

instructions for calculating a perplexity of any new sentence based on a trained language model and a preset perplexity calculation formula, wherein the perplexity indicating a fluency degree of one sentence is calculated using a formula of:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i | w_1 w_2 \ldots w_{i-1})}};$$

where, $S_{new}$ indicates a new sentence, M is the length of the new sentence $S_{new}$, p (w) is a probability of the i-th word in the new sentence $S_{new}$, and the probability is obtained based on the language model;

instructions for sorting the new sentences according to an ascending order of the perplexity; and instructions for retaining the first $X_2$ new sentences based on a result of the sorting, wherein $X_2$ is a preset positive integer.

20. The smart device of claim 15, wherein the instructions for filtering the at least one new sentence based on the preset filtering condition comprise:

instructions for filtering the at least one new sentence based on content words in the at least one new sentence, a cosine similarity between each of the at least one new sentence and the input sentence, and a perplexity of each of the at least one new sentence in order;

wherein, the instructions for filtering the at least one new sentence based on the content words in the at least one new sentence comprises:

instructions for detecting whether there is a redundant content word in any new sentence, wherein the redundant content word is a content word not exist in the input sentence;

instructions for excluding the new sentence in response to there being the redundant content word in the new sentence; and instructions for retaining the new sentence in response to there being no redundant content word in the new sentence;

wherein, the instructions for filtering the at least one new sentence based on the cosine similarity between the each of the at least one new sentence and the input sentence comprises:

instructions for obtaining a sum of word vectors of the new sentence retained after filtering the new sentences based on the content words in the at least one new sentence and a sum of word vectors of the input sentence;

instructions for calculating a cosine similarity of the sum of the word vectors of the new sentence and the sum of the word vectors of the input sentence;

instructions for sorting all the new sentences according to a descending order of the cosine similarity; and instructions for retaining the first $X_3$ new sentences based on a result of the sorting, wherein $X_3$ is a preset positive integer;

wherein, the instructions for filtering the at least one new sentence based on the perplexity of the each of the at least one new sentence comprise:

instructions for calculating a perplexity of the new sentence retained after filtering based on the cosine similarity of the new sentence and the input sentence based on a trained language model and a preset perplexity calculation formula, wherein the perplexity indicating a fluency degree of one sentence is as follows:

$$PP(S_{new}) = p(w_1 w_2 \ldots w_M)^{-\frac{1}{M}}$$
$$= \sqrt[M]{\frac{1}{p(w_1 w_2 \ldots w_M)}}$$
$$= \sqrt[M]{\prod_{i=1}^{M} \frac{1}{p(w_i \mid w_1 w_2 \ldots w_{i-1})}} \; ;$$

where, $S_{new}$ indicates a new sentence, M is the length of the new sentence $S_{new}$, $p(w_i)$ is a probability of the i-th word in the new sentence $S_{new}$, and the probability is obtained based on the language model;

instructions for sorting the new sentences according to an ascending order of the perplexity; and instructions for retaining the first $X_4$ new sentences based on a result of the sorting, wherein $X_4$ is a preset positive integer, and $X_4$ is smaller than $X_3$.

* * * * *